US009463775B2

(12) United States Patent
Eto

(10) Patent No.: US 9,463,775 B2
(45) Date of Patent: Oct. 11, 2016

(54) VEHICULAR EMERGENCY REPORTING DEVICE

(71) Applicant: DENSO CORPORATION, Kariya, Aichi-pref. (JP)

(72) Inventor: Yu Eto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/650,663

(22) PCT Filed: Nov. 18, 2013

(86) PCT No.: PCT/JP2013/006743
§ 371 (c)(1),
(2) Date: Jun. 9, 2015

(87) PCT Pub. No.: WO2014/091677
PCT Pub. Date: Jun. 19, 2014

(65) Prior Publication Data
US 2015/0314754 A1   Nov. 5, 2015

(30) Foreign Application Priority Data
Dec. 11, 2012 (JP) .................. 2012-270391

(51) Int. Cl.
*B60R 25/10* (2013.01)
*B60L 11/00* (2006.01)
(Continued)

(52) U.S. Cl.
CPC .......... *B60R 25/1018* (2013.01); *B60L 11/007* (2013.01); *B60L 11/18* (2013.01); *G08B 25/016* (2013.01); *G08B 29/181* (2013.01)

(58) Field of Classification Search
CPC ... B60L 11/007; B60L 11/18; B50R 25/1018
See application file for complete search history.

(56) References Cited

U.S. PATENT DOCUMENTS

2004/0242182 A1   12/2004   Hidaka et al.
2007/0024117 A1*  2/2007   Boenker ................ B60L 15/20
                                                     370/9.1
(Continued)

FOREIGN PATENT DOCUMENTS

CN   101188045 A    5/2008
CN   201639848 U   11/2010
(Continued)

OTHER PUBLICATIONS

International Search Report and Written Opinion (in Japanese with English Translation) for PCT/JP2013/006743, mailed Feb. 25, 2014; ISA/JP.

*Primary Examiner* — Van Trieu
(74) *Attorney, Agent, or Firm* — Harness, Dickey & Pierce, P.L.C.

(57) ABSTRACT

A vehicular emergency reporting device includes a voltage step-down unit, an auxiliary power source, a voltage step-up unit, a control unit, an emergency report executing unit, and a switching unit. When a decreased voltage decreased by the voltage step-down unit is lower than an increased voltage increased by the voltage step-up unit, the emergency report executing unit performs an emergency report using the increased voltage as the operation voltage. When the decreased voltage is lower than the increased voltage, the switching unit switches a power supply mode between a first mode in which the increased voltage is supplied to the control unit and the emergency report executing unit and a second mode in which an auxiliary power source voltage is supplied to the control unit and the emergency report executing unit without being increased by the voltage step-up unit.

5 Claims, 7 Drawing Sheets

(51) Int. Cl.
*B60L 11/18* (2006.01)
*G08B 25/01* (2006.01)
*G08B 29/18* (2006.01)

(56) References Cited

U.S. PATENT DOCUMENTS

| | | | |
|---|---|---|---|
| 2008/0122592 A1 | 5/2008 | Shimizu | |
| 2008/0197989 A1 | 8/2008 | Kuwabara et al. | |
| 2009/0140673 A1 | 6/2009 | Kasai et al. | |
| 2010/0076636 A1* | 3/2010 | Ichikawa | B60L 3/003 701/22 |
| 2010/0291445 A1 | 11/2010 | Igarashi | |
| 2011/0281545 A1 | 11/2011 | Murakami et al. | |
| 2013/0154354 A1* | 6/2013 | Hayashi | H02J 9/00 307/9.1 |
| 2013/0175858 A1* | 7/2013 | Sakurai | B60L 11/1812 307/9.1 |
| 2015/0002057 A1* | 1/2015 | Zushi | H02P 6/002 318/400.3 |

FOREIGN PATENT DOCUMENTS

| | | |
|---|---|---|
| JP | 2001217741 A | 8/2001 |
| JP | 2006213273 A | 8/2006 |
| JP | 2007015474 A | 1/2007 |
| JP | 2008035560 A | 2/2008 |
| JP | 2008198093 A | 8/2008 |
| JP | 2009165246 A | 7/2009 |
| JP | 2011239202 A | 11/2011 |

* cited by examiner

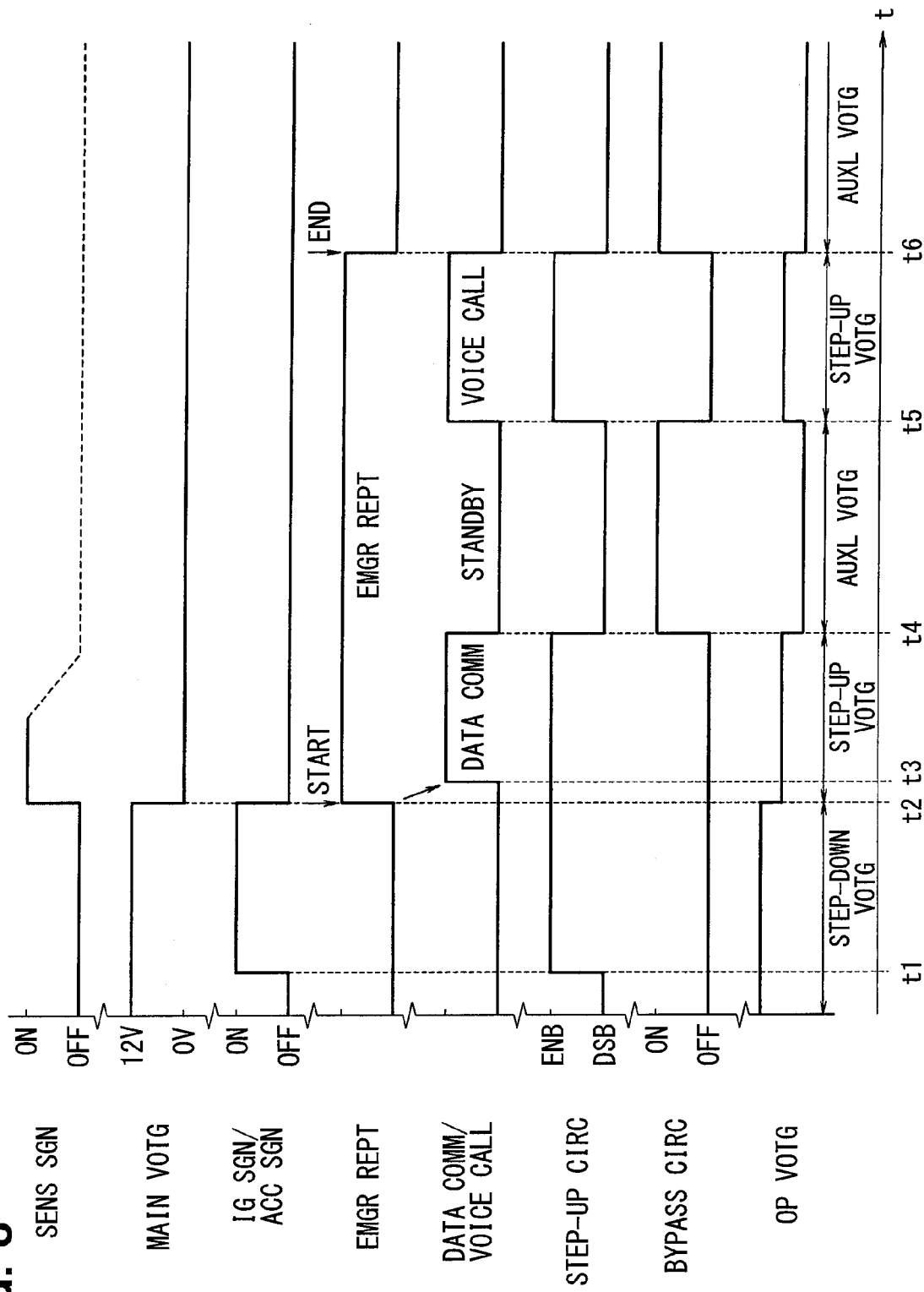

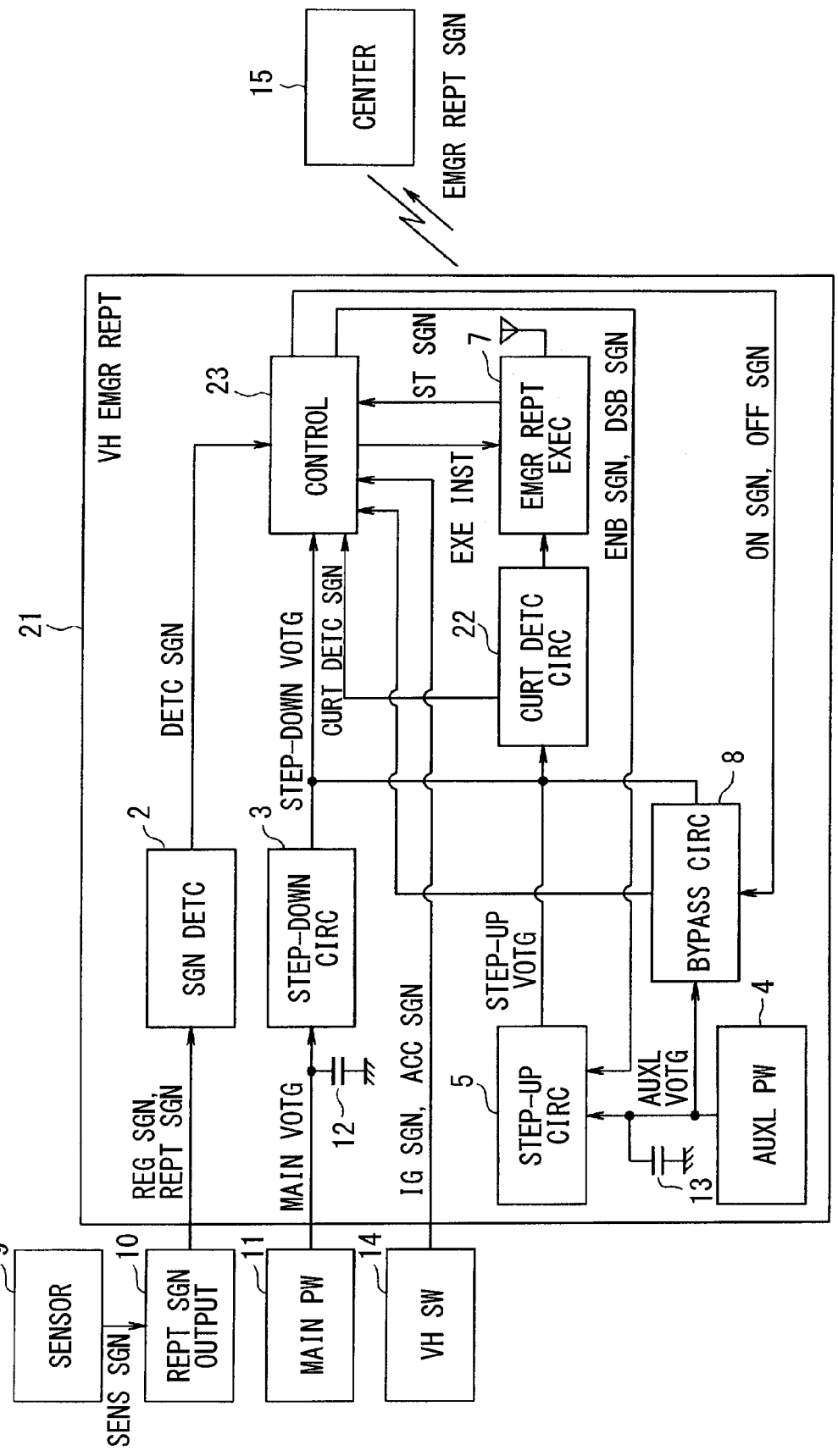

FIG. 6

THRESHOLD REFERRED IN DETERMINATION OF STEP-UP CIRC USE

| TEMPERATURE (°C) | AGE OF USE | | | |
|---|---|---|---|---|
| | 0 | 1 | 2 | ... |
| 40~20 | 0.7A | 0.6A | 0.6A | ... |
| 20~0 | 0.6A | 0.5A | 0.5A | ... |
| 0~−10 | 0.5A | 0.4A | 0.4A | ... |
| −10~−20 | 0.4A | 0.4A | 0.3A | ... |

VEHICULAR EMERGENCY REPORTING DEVICE

CROSS REFERENCE TO RELATED APPLICATIONS

This application is a U.S. National Phase Application under 35 U.S.C. 371 of International Application No. PCT/JP2013/006743 filed on Nov. 18, 2013 and published in Japanese as WO 2014/091677 A1 on Jun. 19, 2014. This application is based on and claims the benefit of priority from Japanese Patent Application No. 2012-270391 filed on Dec. 11, 2012. The entire disclosures of all of the above applications are incorporated herein by reference.

TECHNICAL FIELD

The present disclosure relates to a vehicular emergency reporting device including an auxiliary power source, a voltage step-up unit, and an emergency report executing unit. The auxiliary power source functions as a backup power source of a main power source. The voltage step-up unit generates an increased voltage by increasing an auxiliary power source voltage supplied by the auxiliary power source. The emergency report executing unit performs an emergency report by using the increased voltage supplied by the voltage step-up unit as an operation voltage.

BACKGROUND ART

According to a conventional vehicular emergency reporting device, when a vehicle has a collision accident and the device detects a collision signal output from a collision sensor, the device transmits an emergency report signal to an external emergency facility for performing the emergency report function (refer to, for example, patent literature 1).

Generally, a vehicular emergency reporting device of above-described type includes a voltage step-down circuit that generates a decreased voltage by decreasing a main power source voltage supplied from a main power source (main battery), an auxiliary power source (auxiliary battery) functioning as a backup power source of the main power source, and a voltage step-up circuit that generates an increased voltage by increasing an auxiliary power source voltage supplied from the auxiliary power source. The voltage step-down circuit operates only in the case where the main power source voltage is supplied from the main power source. The voltage step-down circuit supplies the decreased voltage generated by decreasing the main power source voltage to a functional block, which cannot directly uses the main power source voltage as an operation voltage.

In the above configuration, the auxiliary power source is provided by a battery. Since the auxiliary power source needs to be embedded in a vehicular emergency reporting device, the auxiliary power source is requested to be downsized and the number of cells is requested to be reduced. However, the small number of cells inevitably causes a decrease in the auxiliary power source voltage supplied by the auxiliary power source decreases naturally. When the auxiliary power source is almost new and the operation voltage necessary for the emergency report is sufficiently assured by the auxiliary power source voltage, the emergency report can be carried out without any problem. However, the auxiliary power source has a characteristic that the internal resistance increases when the in-vehicle environment is under low temperature or deterioration occurs due to lapse of age of use, and the voltage value of the auxiliary power source voltage generally decreases. As a result, the operation voltage necessary to perform an emergency report may not be assured sufficiently by the auxiliary power source voltage. With consideration of such a circumstance, the voltage step-up circuit is provided to the device. The voltage step-up circuit increases the auxiliary power source voltage supplied from the auxiliary power source, and provides the increased voltage as the operation voltage for performing the emergency report For example, when the main power source voltage is not supplied from the main power source due to breakage, disconnection, or the like of the main power source, the voltage step-up circuit continuously increases the auxiliary power source voltage supplied from the auxiliary power source. However, the increase of the voltage inevitably causes a loss in the voltage step-up circuit. Consequently, even when the voltage step-up circuit continuously increases the auxiliary power source voltage, the power increased by the voltage step-up circuit may be still insufficient for performing an emergency report due to the operation loss in the voltage step-up circuit. As a result, the device may fail to properly carry out the emergency report. As described above, in the conventional configuration, there exists a difficulty in effective use of the auxiliary power source.

PRIOR ART LITERATURES

Patent Literature

[Patent literature 1] JP 2008-198093 A

SUMMARY OF INVENTION

In view of the foregoing difficulties, it is an object of the present disclosure to provide a vehicular emergency reporting device, which improves a power supply efficiency of the auxiliary power source that functions as the backup power source of the main power source, and can properly carry out an emergency report.

According to an aspect of the present disclosure, a vehicular emergency reporting device includes a voltage step-down unit, an auxiliary power source, a voltage step-up unit, a control unit, an emergency report executing unit, and a switching unit. The voltage step-down unit decreases a main power source voltage supplied from a main power source to generate a decreased voltage. The auxiliary power source provides a backup power source of the main power source. The voltage step-up unit increases an auxiliary power source voltage supplied from the auxiliary power source to generate an increased voltage. The control unit operates using the increased voltage as an operation voltage when the decreased voltage is lower than the increased voltage. The emergency report executing unit receives an emergency report execution instruction from the control unit and performs an emergency report. When the decreased voltage is lower than the increased voltage, the emergency report executing unit performs the emergency report using the increased voltage as the operation voltage. The switching unit switches a mode of supplying the operation voltage to the control unit and the emergency report executing unit between a first mode and a second mode when the decreased voltage is lower than the increased voltage. The switching unit controls the voltage step-up unit to supply the increased voltage to the control unit and the emergency report executing unit as the operation voltage in the first mode and controls the auxiliary power source to supply the auxiliary power source voltage to the control unit and the emergency report executing unit as the operation voltage without increasing the auxiliary power source voltage using the voltage step-up unit.

With above device, a power supply efficiency of the auxiliary power source, which functions as the backup power source of the main power source, can be improved, and the device can properly carry out the emergency report.

BRIEF DESCRIPTION OF DRAWINGS

The above and other objects, features and advantages of the present invention will become more apparent from the following detailed description made with reference to the accompanying drawings. In the drawings:

FIG. 3 is a time chart of signals;

FIG. 5 is a block diagram illustrating a functional configuration of a vehicular emergency reporting device according to a second embodiment of the present disclosure;

FIG. 6 is a diagram illustrating relations of a prediction threshold value of consumption current, temperature, and age of use in the voltage step-up circuit.

Figure 1:
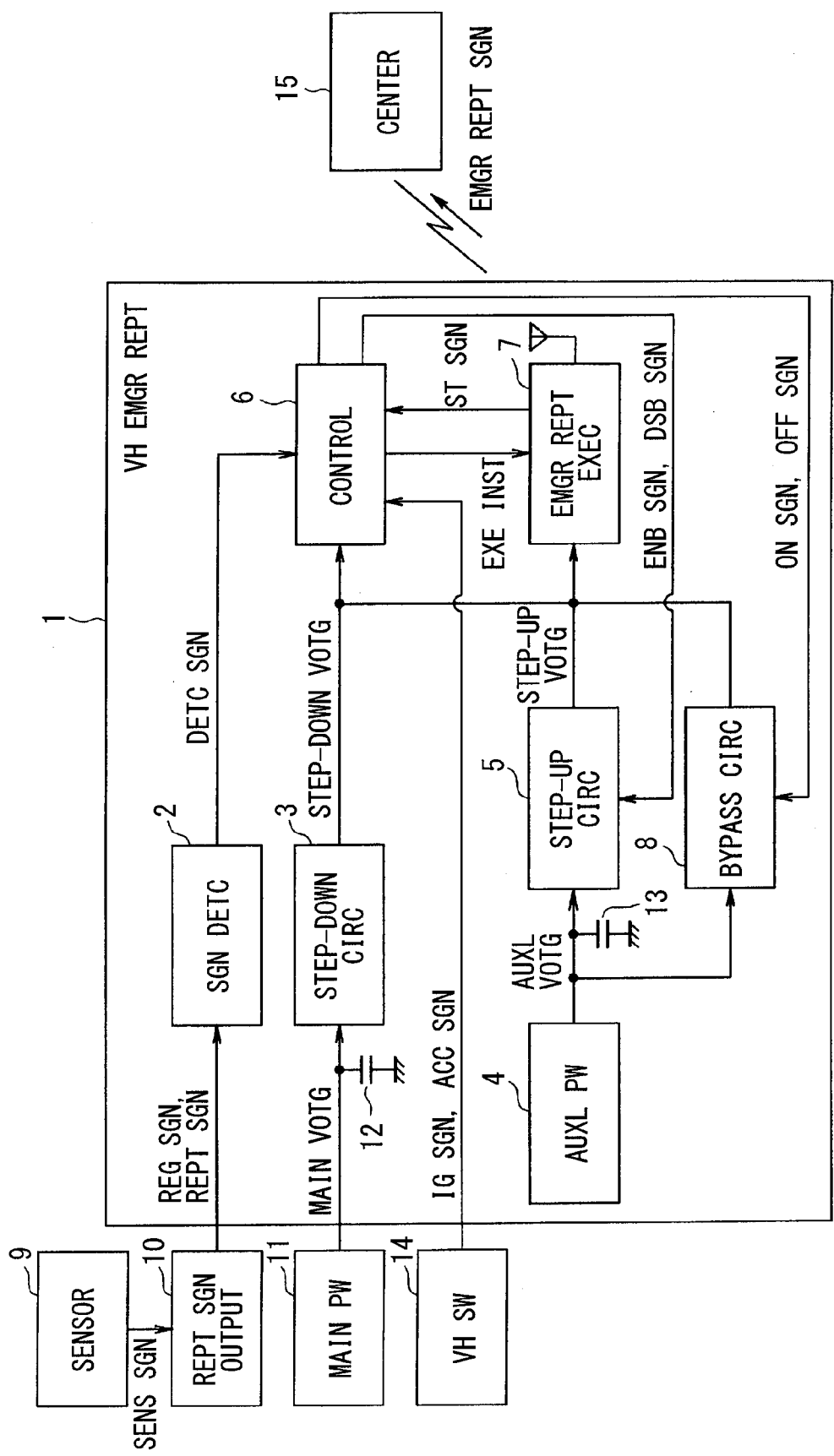
FIG. 1 is a block diagram illustrating a functional configuration of a vehicular emergency reporting device according to a first embodiment of the present disclosure.

EMBODIMENTS FOR CARRYING OUT INVENTION (First Embodiment)
The following will describe a first embodiment of the present disclosure with reference to FIGS. 1 to 4. A vehicular emergency reporting device (VH EMGR REPT) 1 may be equipped to a vehicle and includes a signal detecting unit (SGN DETC) 2, a voltage step-down circuit (STEP-DOWN CIRC) 3, an auxiliary power source (AUXL PW) 4, a voltage step-up circuit 5 (STEP-UP CIRC), a control unit 6 (CONTROL), an emergency report executing unit 7 (EMGR REPT EXEC), and a bypass circuit (BYPASS CIRC) 8. The expression that the vehicular emergency reporting device may be equipped to a vehicle includes both a case in which the vehicular emergency reporting device is equipped to a vehicle in a fixed manner and a case in which that the vehicular emergency reporting device is detachably equipped to a vehicle.

A collision sensor (SENSOR) 9 is provided in a predetermined portion, for example, a front portion of a vehicle body. When the collision sensor 9 reacts to a collision of the vehicle in response to the collision of the vehicle, the collision sensor 9 outputs a sensor signal (SENS SGN) to a report signal output unit (REPT SGN OUTPUT) 10. The report signal output unit 10 may be provided by, for example, an air-bag electronic control unit (ECU) and. During a period while the collision sensor 9 does not output a sensor signal, the report signal output unit 10 outputs a regular signal (REG SGN) to the signal detecting unit 2. Herein, the regular signal may be provided by a pulse signal. On the other hand, when receiving the sensor signal from the collision sensor 9, the report signal output unit 10 outputs a report signal (REPT SGN), which is different from the regular signal, to the signal detecting unit 2 and controls an expansion of an air bag (not illustrated) to protect the driver and an accompanying passenger from the impact of the collision. Herein, the report signal may also be provided by a pulse signal.

The signal detecting unit 2 detects the pulse signal supplied from the report signal output unit 10, detects a period (high-pulse continuation period) from a rising edge to a falling edge of the supplied pulse signal, a period (low-pulse continuation period) from a falling edge to a rising edge, or the like. Then, the signal detecting unit 2 outputs, to the control unit 6, a detection signal (DETC SGN) based on which the detection result is able to be specified.

The voltage step-down circuit 3, which functions as a voltage step-down unit, is connected to a main power source (MAIN PW) 11. The main power source 11 is provided by a battery equipped to a vehicle, and is always in an enabled state. The main power source 11 is also referred to as a main battery. When the main power source 11 supplies a main power source voltage (MAIN VOTG) to the voltage step-down circuit 3, the voltage step-down circuit 2 performs a voltage conversion to the supplied main power source voltage (decreases the voltage). Specifically, the voltage step-down circuit 3 sets a predetermined voltage value (first set voltage value) as the lower limit of voltage step down. For example, the lower limit may be set to five volts (V). Then, the voltage step-down circuit 3 converts the main power source voltage, which is supplied from the main power source 11 and may have a value of 12V, to a step-down voltage (STEP-DOWN VOTG) having a value of five volts. Then, the voltage step-down circuit 3 supplies the generated step-down voltage to functional blocks including the control unit 6 and the emergency report executing unit 7. Usually, the functional blocks including the control unit 6 and the emergency report executing unit 7 have operation voltages of, for example, about three to five volts. Thus, when the main power source voltage having a value of, for example, 12V is supplied from the main power source 11 directly to the functional blocks, the functional blocks may fail to operate in a proper manner. At the anterior stage of the voltage step-down circuit 3 (on the input side of the main power source voltage), a capacitor 12 for temporarily storing the main power source voltage is connected.

The auxiliary power source 4, which is provided by a battery, functions as a backup power source of the main power source 11. Therefore, the auxiliary power source 4 is also referred to as an auxiliary battery. Since the auxiliary power source 4 needs to be embedded in the vehicular emergency reporting device 1, it is preferable that the auxiliary power source 4 has a compact size and has small number of cells. For example, the auxiliary power source 4 may be provided by a lithium-ion battery having 4V×1 cell, or a nickel-hydrogen battery having 1.2V×3 or 4 cells, or a manganese dioxide lithium battery having 3V×1 cell. These examples of the auxiliary power source 4 have characteristics that the internal resistance increases when the in-vehicle environment is under low temperature or deterioration occurs due to lapse of age of use. As a result, the value of the auxiliary power source voltage generally decreases. The auxiliary power source 4 is provided in the vehicular emergency reporting device 1 in a replaceable manner so that it can be replaced by an operator.

The voltage step-up circuit 5, which functions as a voltage step-up unit, is connected to the auxiliary power source 4. An operation state of the voltage step-up circuit 5 switches between an enabled state and a disabled state in accordance with an input state of an enabling signal (ENB SGN) or a disabling signal (DSB SGN) from the control unit 6. The voltage step-up circuit 5 switches to the enabled state when receiving the enabling signal, and switches to the disabled state when receiving the disabling signal. When an auxiliary power source voltage (AUXL VOTG) is supplied from the auxiliary power source 4, the voltage step-up circuit 5 performs a voltage conversion to the supplied auxiliary power source voltage (increases the voltage). Specifically, the voltage step-up circuit 5 sets a predetermined voltage value (second set voltage value) as the upper limit of voltage step up. For example, the upper limit may be set to 4.8V. When the voltage step-up circuit 5 is in the enabled state and the step-down voltage is not properly supplied from the voltage step-down circuit 3 to the control unit 6 and the emergency report executing unit 7, the voltage step-up circuit 5 converts the auxiliary power source voltage supplied from the auxiliary power source 4 to generate a step-up voltage (STEP-UP VOTG) of 4.8V, and supplies the generated step-up voltage to functional blocks including the control unit 6 and the emergency report executing unit 7. In the case where the voltage value of the auxiliary power source voltage drops and the dropped auxiliary power source voltage is supplied from the auxiliary power source 4 directly to the functional blocks, the functional blocks may fail to operate in a proper manner.

In a case where the step-down voltage is normally supplied from the voltage step-down circuit 3 to the control unit 6 and the emergency report executing unit 7, the voltage step-up circuit 5 does not convert the auxiliary power source voltage supplied from the auxiliary power source 4 even when the voltage step-up circuit 5 is in the enabled state. At the anterior stage of the voltage step-up circuit 5 (the input side of the auxiliary power source voltage), a capacitor 13 for temporarily storing the auxiliary power source voltage is connected. As described above, the preliminarily set voltage value of the voltage step-up circuit 5 is lower than the preliminarily set voltage value of the voltage step-down circuit 3. The preliminarily set voltage value of the voltage step-up circuit 5 lies in the range of the operation voltages (for example, 3 to 5 V) of the functional blocks. In FIG. 1, the step-up voltage is connected at the posterior stage of the voltage step-down circuit 3. Alternatively, the step-up voltage may be connected at the anterior stage of the voltage step-down circuit 3.

A bypass circuit 8 switches between an on state and an off state in accordance with an input state of an on signal (ON SGN) or an off signal (OFF SGN) from the control unit 6. The bypass circuit 8 switches to the on state when receiving the on signal from the control unit 6, and switches to the off state when receiving the off signal from the control unit 6. In the on state, the bypass circuit 8 supplies the auxiliary power source voltage, which is supplied from the auxiliary power source 4, to the control unit 6 and the emergency report executing unit 7 without converting the voltage.

The control unit 6 is provided by a microcomputer as a main body. The microcomputer includes a CPU, a ROM, and a RAM, and executes operation programs stored in the ROM, thereby controlling the general operation of the vehicular emergency reporting device 1. The control unit 6 operates using one of the step-down voltage or the step-up voltage as the operation voltage. The voltage step-down circuit 3 generates the step-down voltage by decreasing the main power source voltage of the main power source 11, and supplies the step-down voltage to the control unit 6. The voltage step-up circuit 5 generates the step-up voltage by increasing the auxiliary power source voltage of the auxiliary power source unit 4, and supplies the step-up voltage to the control unit 6 via the bypass circuit 8. The control unit 6 also functions as a switching unit.

In a state where an ignition switch (IG) and an accessory switch (ACC) are in off state, the control unit 6 monitors input of an IG signal (IG SGN) and input of an ACC signal (ACC SGN) from a vehicle switch (VH SW) 14 in a low power consumption mode. When determining input of the IG signal or ACC signal, the control unit determines that the IG or the ACC turns from the off state to the on state. When a detection signal is received from the signal detecting unit 2, the control unit 6 analyzes the inputted detection signal to determine whether the pulse signal output from the report signal output unit 10 is a report signal or a regular signal. That is, the control unit 6 analyzes the inputted detection signal to determine whether vehicle collision is occurred or not. When the pulse signal output from the report signal output signal 10 is the report signal, that is, when the control unit 6 determines that the vehicle collision occurs, the control unit 6 outputs an emergency report execution instruction (EXE INST) to the emergency report executing unit 7.

Similar to the control unit 6, the emergency report executing unit 7 operates using any one of the step-down voltage or the step-up voltage as the operation voltage. The voltage step-down circuit 3 generates the step-down voltage by decreasing the main power source voltage of the main power source 11, and supplies the step-down voltage to the control unit 6. The voltage step-up circuit 5 generates the step-up voltage by increasing the auxiliary power source voltage of the auxiliary power source unit 4, and supplies the step-up voltage to the control unit 6 via the bypass circuit 8. The emergency report executing unit 7 has telephone function (a transmission function of transmitting a signal to a communication network a reception function of receiving a signal from the communication network, a voice call function of making a voice call, a data communication function of performing data communication, and the like). When the emergency report executing unit 7 receives an instruction to execute an emergency report from the control unit 6, the emergency report executing unit 7 performs an emergency report using the telephone function. Specifically, the emergency report executing unit 7 performs an emergency report by transmitting an emergency report signal (EMGR REPT SGN) to a center apparatus 15 (CENTER) of an external facility via a wide-area communication network (including a mobile communication network and a fixed communication network). The center apparatus 15 is provided at the external facility and the external facility is a facility that is preliminarily registered. The emergency report signal may include the present position of the vehicle and pre-registered vehicle identification information (such as vehicle number and the user of the vehicle) based on which the vehicle can be specified. The present position of the vehicle may be specified by a present position specifying unit (not illustrated) using GPS measurement function.

When the center apparatus 15 receives the emergency report signal from the vehicular emergency reporting device 1 via the wide-area communication network as described above, the center apparatus 15 notifies occurrence of the emergency report to the operator at the external facility. Then, when receiving a rescue request, the operator gives necessary assistance to the person in emergency situation. The operator may assist or rescue the user (driver) in emergency situation in various methods. The vehicular emergency reporting device 1 may transmit a signal (call request) to the center apparatus 15 to connect a telephone line. In this case, the vehicular emergency reporting device 1 may transmit the present position of the vehicle and the vehicle identification information to the center apparatus 15, and then, disconnects the telephone line temporarily. Then, the center apparatus 15 may transmit a signal (calls back) to the vehicular emergency reporting device 1 to connect the telephone line, and the user is able to make a voice call using the telephone line. As another example, the data communication may be switched to a voice call without disconnecting the telephone line. That is, the data communication may be switched to the voice call while maintaining the connection state between the vehicular emergency reporting device and the center apparatus 15.

When the emergency report executing unit 7 starts the emergency report on receipt of an emergency report execution instruction from the control unit 6, the emergency report executing unit 7 outputs, to the control unit 6, a state notification signal (ST SGN) based on which the operation state of the emergency report executing unit 7 can be specified. Herein, the operation state may be any of a data communication state, a voice call state, a standby state for signal transmission or signal reception, a state indicating whether the emergency report is finished or not. By receiving and analyzing the state notification signal transmitted from the emergency report executing unit 7, the control unit 6 can specify whether the emergency report executing unit 7 is in any of the data communication state, the voice call state, the standby state, or the state in which the emergency report has been finished. The emergency report executing unit 7 may voluntarily and periodically output the state notification signal to the control unit 6. As another example, the emergency report executing unit 7 may output the state notification signals to the control unit 6 in response to state inquiry signals that are periodically transmitted from the control unit 6. As another example, the emergency report executing unit 7 may output the state notification signal to the control unit 6 at the timing when the operation state of the emergency report executing unit 7 is switched.

During the execution of the emergency report, the emergency report executing unit 7 is in one of the data communication state, the voice call state, or the standby state. The current value of consumption current during the data communication state or during the voice call state is higher than a current value of the consumption current during the standby state. That is, in the case where the emergency report executing unit 7 performs the emergency report using, as the operation voltage, the auxiliary power source voltage supplied by the auxiliary power source 4, the voltage value of the auxiliary power source voltage drops more greater in the data communication state or in the voice call state than in the standby state.

Figure 2:
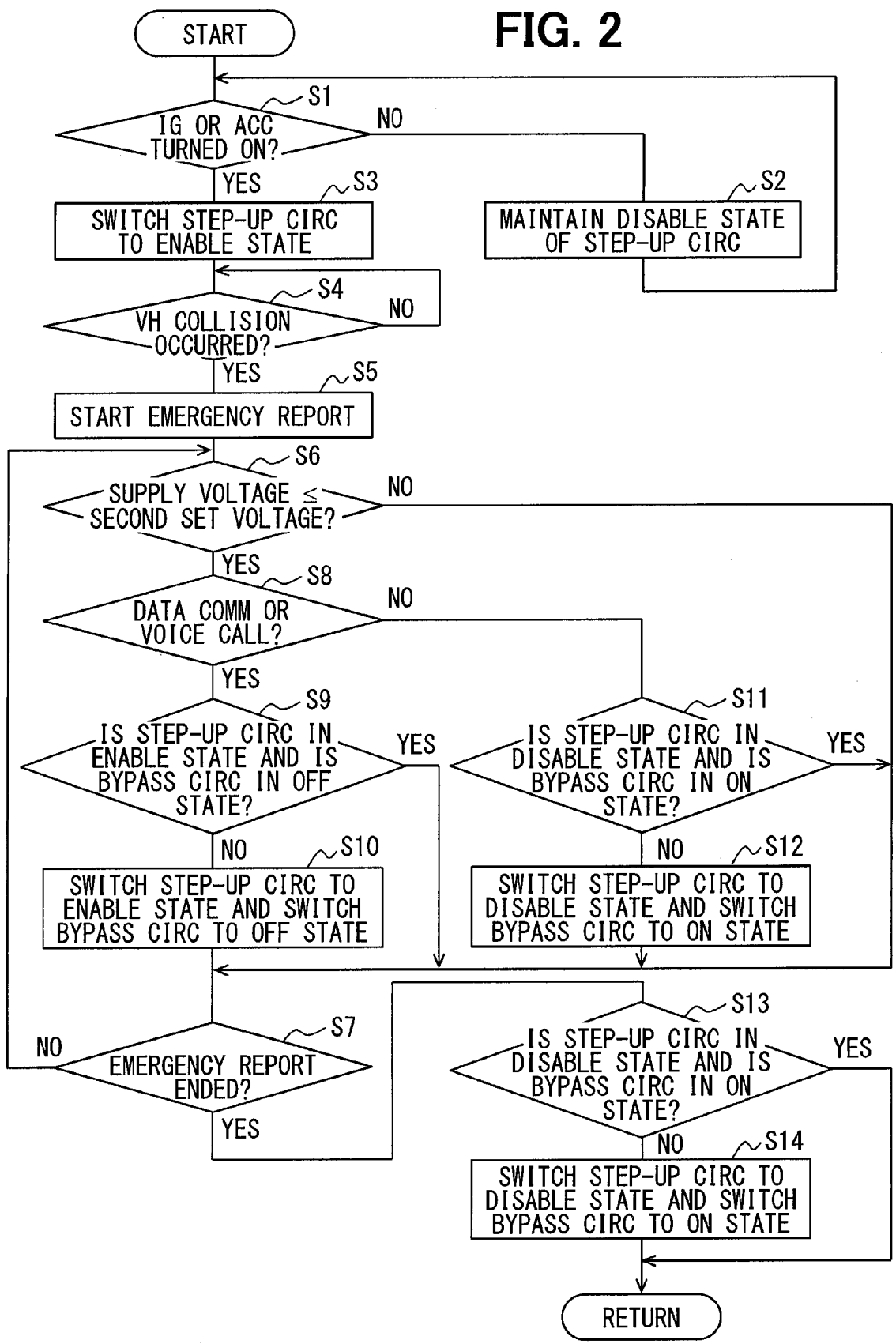
FIG. 2 is a flowchart illustrating an emergency reporting process for a vehicle according to the first embodiment.

The following will describe the operation of the above-described configuration with reference to FIGS. 2 to 4. Since the auxiliary power source 4 is downsized as described above, the initial voltage value of the auxiliary power source voltage supplied by the auxiliary power source 4 is relatively low. In addition, since a power loss occurs in the voltage step-up circuit 5, when the voltage step-up circuit 5 continuously operates, the auxiliary power source 4 may fail to supply power necessary for an emergency report due to the loss in the voltage step-up circuit 5. In view of such a circumstance, the control unit 6 performs the process described below.

When both the IG and ACC are in off state, the control unit 6 maintains the voltage step-up circuit 5 in the disabled state (that is, the disabled state is not switched to the enabled state). Consequently, the control unit 6 uses the step-down voltage supplied from the voltage step-down circuit 3 as the operation voltage (OP VOTG). That is, the control unit 6 uses the main power source 11 as the operation power source. The control unit 6 monitors whether an IG signal or ACC signal is received from the vehicle switch 14 and monitors whether the IG or ACC switches from the off state to the on state (step S1). During a period in which the control unit 6 determines none of the IG signal or the ACC signal is inputted and none of the IG or ACC is switched from the off state to the on state (step S1: NO), the control unit 6 continuously maintains the voltage step-up circuit 5 in the disabled state without outputting an enabling signal to the voltage step-up circuit 5 (step S2).

When the control unit 6 determines that the IG signal or ACC signal is inputted and further determines that the IG or ACC is switched from the off state to the on state (S1: YES, refer to "t1" in FIG. 3), the control unit 6 outputs the enabling signal to the voltage step-up circuit 5 and switches the voltage step-up circuit 5 from the disabled state to the enabled state (step S3). At this time, the voltage step-up circuit 5 is switched from the disabled state to the enabled state. At this time, the step-down voltage is normally supplied from the voltage step-down circuit 3 to the control unit 6 and the emergency report executing unit 7. Thus, the voltage step-up circuit 5 does not increase the auxiliary power source voltage supplied by the auxiliary power source 4. That is, even when the voltage step-up circuit 5 is switched from the disabled state to the enabled state, the control unit 6 continuously uses the step-down voltage supplied from the voltage step-down circuit 3 as an operation voltage and continuously uses the main power source 11 under a condition that the step-down voltage is normally supplied.

Subsequently, the control unit 6 analyzes the detection signal supplied from the signal detecting unit 2, determines whether the pulse signal output from the report signal output unit 10 is a report signal or a normal signal for determining whether a collision of the vehicle is occurred or not (step S4). When the control unit 6 determines that the pulse signal output from the report signal output unit 10 is a report signal and determines the collision of the vehicle is occurred (step S4: YES, refer to "t2" in FIG. 3), the control unit 6 outputs an emergency report execution instruction to the emergency report executing unit 7 and controls the emergency report executing unit 7 to start an emergency report (step S5). As described above, when receiving the emergency report execution instruction from the control unit 6, the emergency report executing unit 7 transmits an emergency report signal, which includes the present position of the vehicle and the vehicle identification information indicating the vehicle identification, to the center apparatus 15 of the external facility. As described above, the external facility is preliminarily registered in the vehicular emergency reporting device 1 via a wide-area communication network.

When the control unit 6 controls the emergency report executing unit 7 to start the emergency report, the control unit 6 determines whether the voltage value of the supplied voltage decreases to the voltage value of the preliminarily set voltage of the voltage step-up circuit 5 or not (step S6). In a case where the collision of the vehicle occurs but the main power source 11 is not broken nor becomes disconnected from the vehicular emergency reporting device 1 and the main power source voltage from the main power source 11 is supplied normally, the voltage step-down circuit 3 continuously supplies the step-down voltage to the control unit 6 and the emergency report executing unit 7. Thus, the voltage value of the supplied voltage does not decrease to the preliminarily set voltage value of the voltage step-up circuit 5.

When the control unit 6 determines that the main power source voltage is normally supplied from the main power source 11 and the voltage value of the supplied voltage does not decrease to the voltage value of the preliminarily set voltage of the voltage step-up circuit 5 (step S6: NO), the control unit 6 determines whether the emergency report has been finished or not on the basis of a state notification signal output from the emergency report executing unit 7 (step S7). When the control unit 6 determines that the emergency report is not finished (step S7: NO), the control unit 6 returns to step S6. That is, during the period in which the emergency report executing unit 7 is performing the emergency report, the control unit 6 continuously determines whether or not the voltage value of the supplied voltage drops to the voltage value of the preliminarily set voltage of the voltage step-up circuit 5.

When the main power source 11 is broken or becomes disconnected from the vehicular emergency reporting device 1 due to the impact of the collision of the vehicle and the supply of the main power source voltage from the main power source 11 becomes abnormal, the voltage step-down circuit 3 may fail to properly supply the step-down voltage to the control unit 6 and the emergency report executing unit 7. As a result, the voltage value of the supplied voltage decreases to the voltage value of the preliminarily set voltage of the voltage step-up circuit 5. At this time, the voltage step-up circuit 5 starts increasing the auxiliary power source voltage supplied from the auxiliary power source 4 in order to supply the increased voltage to the control unit 6 and the emergency report executing unit 7 instead of the decreased voltage from the voltage step-down circuit 3.

When the control unit 6 determines that the main power source voltage is not normally supplied from the main power source 11 and the voltage value of the supplied voltage decreases to the voltage value of the preliminarily set voltage of the voltage step-up circuit 5 (step S6: YES), the control unit 6 further determines whether the emergency report executing unit 7 is performing data communication (DATA COMM) or voice call (VOICE CALL) based on the state notification signal output from the emergency report executing unit 7 (step S8). At this time, instead of the decreased voltage supplied by the main power source 11, the control unit 6 and the emergency report executing unit 7 use, as the operation voltage, the increased voltage supplied by the auxiliary power source 4.

When the control unit 6 determines that the emergency report executing unit 7 is performing data communication or voice call (step S8: YES, refer to "t3" in FIG. 3), the control unit 6 determines whether the voltage step-up circuit 5 is in the enabled state and the bypass circuit 8 is in the off state at the same time point (step S9). When the control unit 6 determines that the voltage step-up circuit 5 is in the enabled state and the bypass circuit 8 is in the off state (S9: YES), the control unit 6 maintains the operation states of the voltage step-up circuit 5 and the bypass circuit 8. When the control unit determines that the voltage step-up circuit 5 is not in the enabled state and the bypass circuit 8 is not in the off state (S9: NO), the control unit 6 outputs an enabling signal to the voltage step-up circuit 5 to switch the voltage step-up circuit 5 to the enabled state, and further outputs an off signal to the bypass circuit 8 to switch the bypass circuit 8 to the off state (step S10).

The control unit 6 determines whether the emergency report is finished or not on the basis of the state notification signal output from the emergency report executing unit 7 (step S7). When the control unit 6 determines that the emergency report is not finished (step S7: NO), the control unit 6 returns to step S6. As described above, during the data communication or the voice call, the current value of consumption current of the emergency report executing unit 7 is relatively large and the voltage value of the auxiliary power source voltage may drop substantially and quickly. Thus, when the control unit 6 determines that the emergency report executing unit 7 is performing data communication or voice call, the control unit 6 uses the voltage step-up circuit 5 for supplying the operation voltage.

When the control unit 6 determines that the emergency report executing unit 7 is in the standby state (STANDBY) (does not perform data communication nor voice call) (step S8: NO, refer to "t4" in FIG. 3), the control unit 6 determines whether the voltage step-up circuit 5 is in the disabled state and the bypass circuit 8 is in the on state at the same time point (step S11). When the control unit 6 determines that the voltage step-up circuit 5 is not in the disabled state and the bypass circuit 8 is not in the on state (step S11: NO), the control unit 6 outputs the disabling signal to the voltage step-up circuit 5 to switch the voltage step-up circuit 5 from the enabled state to the disabled state and outputs the on signal to the bypass circuit 8 to switch the bypass circuit 8 from the off state to the on state (step S12). At this time, the auxiliary power source 4 directly supply the auxiliary power source voltage to the control unit 6 and the emergency report executing unit 7. Thus, the control unit 6 and the emergency report executing unit 7 uses the auxiliary power source voltage supplied by the auxiliary power source 4 as the operation voltage in place of the increased voltage.

The control unit 6 determines whether the emergency report is finished or not on the basis of the state notification signal output from the emergency report executing unit 7 (step S7). When the control unit 6 determines that the emergency report is not finished (step S7: NO), the control unit 6 returns to step S6. As described above, when the emergency report executing unit 7 is in the standby mode, the current value of consumption current of the emergency report executing unit 7 is relatively small and drop of the voltage value of the auxiliary power source voltage is relatively small. Thus, when the control unit 6 determines that the emergency report executing unit 7 is in the standby mode, the control unit receives power via the bypass circuit 8 without using the voltage step-up circuit 5.

When the control unit 6 determines that the emergency report executing unit 7 is in the standby mode (step S8: NO), and later, determines that the emergency report executing unit 7 is performing data communication or voice call (step S8: YES, refer to "t5" in FIG. 3) and the voltage step-up circuit 5 is not in the enabled state and the bypass circuit 8 is not in the off state (step S9: NO), the control unit 6 outputs the enabling signal to the voltage step-up circuit 5 to switch the voltage step-up circuit 5 from the disabled state to the enabled state and outputs the off signal to the bypass circuit 8 to switch the bypass circuit 8 from the on state to the off state (step S10). At this time, the step-up circuit 5 supplies the increased voltage again to the control unit 6 and the emergency report executing unit 7 in place of the auxiliary power source voltage, and the control unit 6 and the emergency report executing unit 7 use the increased voltage as the operation voltage.

When the control unit 6 determines that the emergency report is finished (step S7: YES, refer to "t6" in FIG. 3), the control unit 6 determines whether the voltage step-up circuit 5 is in the disabled state and the bypass circuit 8 is in the on state (step S13). When the control unit 6 determines that the voltage step-up circuit 5 is not in the disabled state and the bypass circuit 8 is not in the on state (step S13: NO), the control unit 6 outputs a disabling signal to the voltage step-up circuit 5 to switch the voltage step-up circuit 5 from the enabled state to the disabled state, and outputs an on signal to the bypass circuit 8 to switch the bypass circuit 8 from the off state to the on state (step S14), and finishes the process. At this time, since the auxiliary power source 4 directly supplies the auxiliary power source voltage to the control unit 6 and the emergency report executing unit 7 in place of the increased voltage, the control unit 6 and the emergency report executing unit 7 use, as the operation voltage, the auxiliary power source voltage in place of the increased voltage.

By performing the above-described process, the control unit 6 uses the auxiliary power source 4 during a period while the emergency report executing unit 7 performs the emergency report in a state where the main power source voltage is not normally supplied by the main power source 11. More specifically, while the emergency report executing unit 7 performs data communication or voice call, the voltage step-up circuit 5 supplies the increased voltage to the control unit 6 and the emergency report executing unit 7. While the emergency report executing unit 7 is in the standby state, the auxiliary power source 4 directly supplies auxiliary power source voltage to the control unit 6 and the emergency report executing unit 7 without using the step-up circuit 5. That is, during the period in which the emergency report executing unit 7 performs an emergency report, instead of continuously increasing the auxiliary power source voltage supplied by the auxiliary power source 4 using the step-up circuit 5, the control unit 6 switches the supply mode between a mode (first mode) of increasing the auxiliary power source voltage using the voltage step-up circuit 5 and a mode (second mode) of not increasing the auxiliary power source voltage, according to the operation state of the emergency report executing unit 7. Specifically, when the emergency report executing unit 7 is performing the data communication or voice call, the control unit 6 controls the voltage step-up circuit 5 to increase the auxiliary power source voltage. When the emergency report executing unit 7 is in the standby state, the control unit 6 does not increase the auxiliary power source voltage. As a result, a loss caused by the continuous operation of the voltage step-up circuit 5 can be suppressed.

Figure 4A:
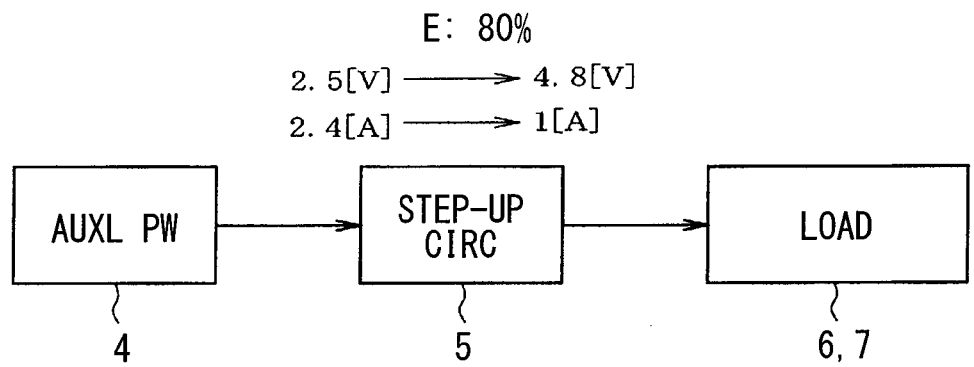
FIG. 4A is a diagram illustrating a relation between a voltage value and a current value in a voltage step-up circuit without a bypass circuit.
Figure 4B:
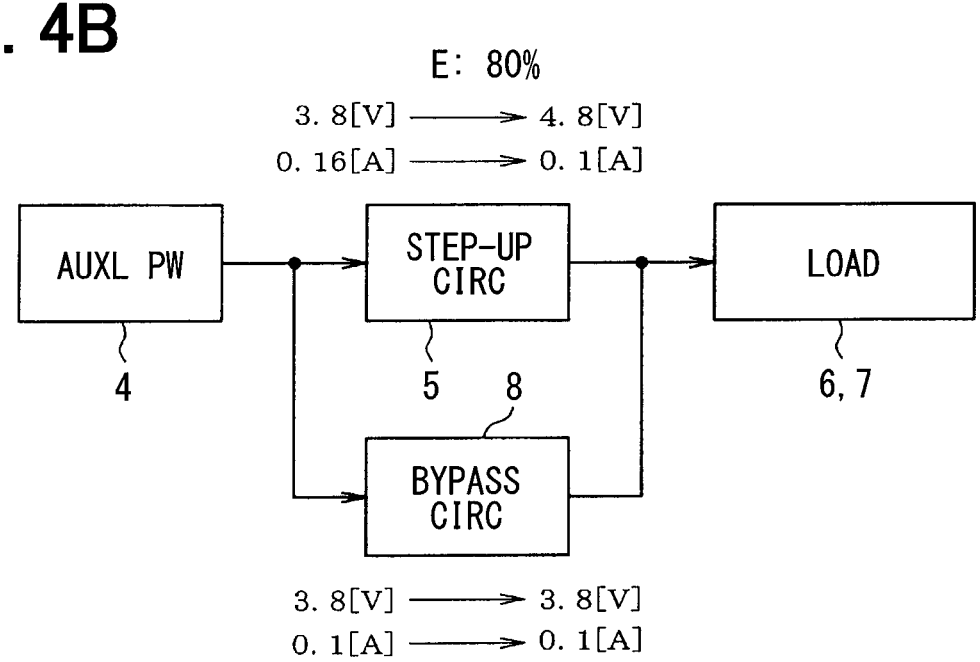
FIG. 4B is a diagram illustrating a relation between the voltage value and the current value in the voltage step-up circuit with a bypass circuit.

As illustrated in FIG. 4A, when the current value of the current supplied by the auxiliary power source 4, that is, the consumption current of the control unit 6 and the emergency report executing unit 7 is relatively large, voltage drop of the auxiliary power source voltage, which correspond to the load (LOAD), is relatively large. As illustrated in FIG. 4B, when the current value of the current supplied by the auxiliary power source 4, that is, the consumption current of the control unit 6 and the emergency report executing unit 7 is relatively small, voltage drop of the auxiliary power source voltage, which corresponds to the load, is relatively small. In the present embodiment, with consideration of these factors, in the case where the current value of the consumption current of the control unit 6 and the emergency report executing unit 7 is relatively small, the auxiliary power source voltage is not increased using the voltage step-up circuit 5. FIGS. 4A and 4B illustrate the cases where the efficiency (E) of the voltage step-up circuit 5 is 80%.

As described above, according to the first embodiment, at the time of performing an emergency report in the vehicular emergency reporting device 1, the voltage step-up circuit 5 does not continuously increase the auxiliary power source voltage supplied from the auxiliary power source 4, and the control unit 6 switches power supply mode between the mode of increasing the auxiliary power source voltage using the voltage step-up circuit 5 and the mode of not increasing the auxiliary power source voltage. As a result, the auxiliary power source 4 can be properly and effectively used by suppressing a loss caused by continuous operation of the voltage step-up circuit 5, and the vehicular emergency reporting device 1 can properly perform the emergency report.

The voltage step-up circuit 5 increases the voltage and supplies the increased voltage during the data communication or voice call in which the current value of the consumption current of the emergency report executing unit 7 is relatively large, and the voltage step-up circuit 5 does not increase the voltage during the standby mode in which the current value of the consumption current of the emergency report executing unit 7 is relatively small. The mode of increasing the auxiliary power source voltage using the voltage step-up circuit 5 and the mode of not increasing the auxiliary power source voltage using the voltage step-up circuit 5 is properly switched according to the operation state of the emergency report executing unit 7, which is one of the data communication state, the voice call state, or the standby mode. Thus, the auxiliary power source 4 can supply the operation voltage more effectively and more properly.

The voltage value of the preliminarily set voltage of the voltage step-up circuit 5 is set to be lower than the voltage value of the preliminarily set voltage of the voltage step-down circuit 3 and is also set to be within the range of the operation voltages of the functional blocks. Consequently, when the main power source voltage decreases but maintains higher than the preliminarily set voltage of the voltage step-up circuit 5, the voltage step-up circuit 5 does not increase the auxiliary power source voltage. Thus, useless power supply from the auxiliary power source 4 can be suppressed, and the auxiliary power source 4 can be used more effectively and more properly. By providing the voltage step-up circuit 5 as described above, the capacitance of the capacitor 12 provided at the anterior stage of the voltage step-down circuit 3 can also be decreased.

(Second Embodiment)

Figure 7:
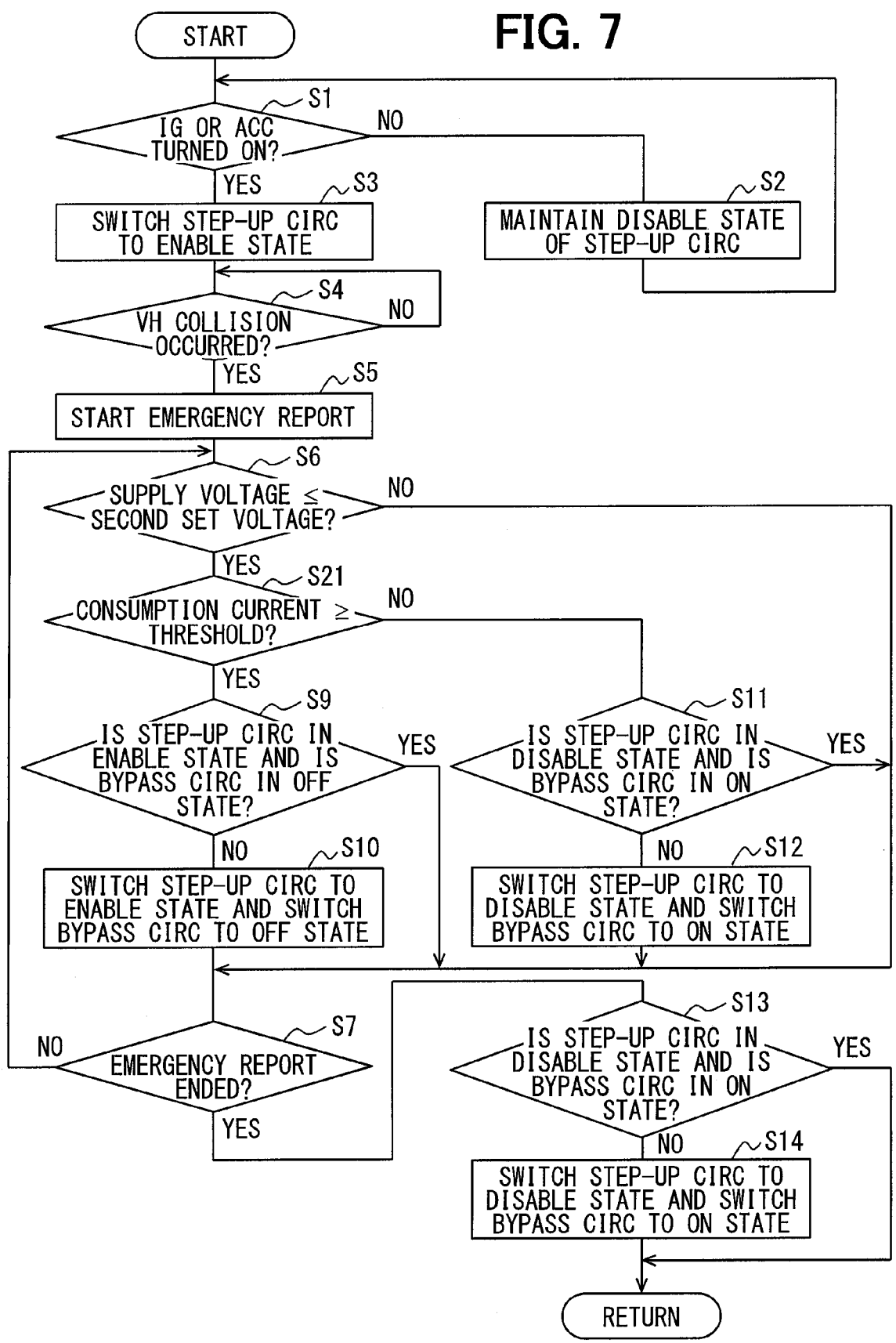
FIG. 7 is a flowchart illustrating an emergency reporting process for a vehicle according to the second embodiment.

The following will describe the second embodiment of the present disclosure with reference to FIGS. 5 to 7. The description on the same parts as those of the above-described first embodiment will not be repeated, and different parts will be described. In the first embodiment, whether to use the voltage step-up circuit 5 or not is determined according to the operation state of the emergency report executing unit 7, which is one of the data communication state, the voice call state, or the standby mode. In the second embodiment, whether to use the voltage step-up circuit 5 is determined according to the current value of the consumption current of the emergency report executing unit 7.

According to the present embodiment, a vehicular emergency reporting device 21 includes a current detecting circuit (CURT DETC CIRC) 22. The current detecting circuit 22 is provided at the anterior stage of the emergency report executing unit 7. The current detecting circuit 22 detects the current value of the current flowing from the voltage step-up circuit 5 to the emergency report executing unit 7. That is, the current detecting circuit 22 detects the consumption current of the emergency report executing unit 7, and outputs, to a control unit 23, a current detection signal (CURT DETC SGN) based on which the detected current value can be specified. The control unit 23 analyzes the current detection signal output from the emergency report executing unit 7, and specifies the current value of the consumption current of the emergency report executing unit 7. The current detecting circuit 22 may voluntarily and periodically output the current detection signal to the control unit 23 or may output the current detection signal to the control unit 23 in response to a consumption current inquiry signal transmitted from the control unit 23.

As illustrated in FIG. 6, the control unit 23 stores multiple records of correspondence relations, each of which indicating a correspondence relation among a predictive current threshold, temperature, and age of use. The predictive current threshold is set as a criterion of determining whether to increase the voltage using the voltage step-up circuit 5. Specifically, with consideration of the characteristic that the voltage value of the auxiliary power source voltage decreases with a temperature decrease of the in-vehicle environment and an increase of the age of use, the control unit 23 stores multiple records of predictive current thresholds which become lower with the decrease of the temperature and with the increase of age of use. The control unit 23 specifies the temperature of the in-vehicle environment based on, for example, a temperature detection signal provided by a temperature sensor (not illustrated), and specifies the age of use of the auxiliary power source 4 by subtracting the registered date when the use of the auxiliary power source 4 has been started from the present date.

For example, when the control unit 23 determines that the main power source 11 becomes broken or becomes disconnected from the device by the impact caused by the collision of the vehicle, the main power source 11 cannot supply normal voltage to the device. When the voltage value of the supplied voltage decreases to the voltage value of the preliminarily set voltage of the voltage step-up circuit 5 (step S6: YES), the control unit 23 specifies the current value of the consumption current of the emergency report executing unit 7 based on the current detection signal output from the current detection circuit 22. The control unit 23 specifies the temperature of the in-vehicle environment and the age of use of the auxiliary power source 4 at the same time point. Then, the control unit 23 refers to the predetermined corresponding relations of the predictive current threshold, temperature, and the age of use, and specifies a value of the predictive current threshold, as a threshold value, corresponding to the temperature of the in-vehicle environment and the age of use of the auxiliary power source 4.

The control unit 23 determines whether the specified current value of the consumption current of the emergency report executing unit 7 is equal to or higher than the threshold value or not (step S21). When the control unit 23 determines that the current value of the consumption current of the emergency report executing unit 7 is equal to or higher than the threshold value (step S21: YES), the control unit 23 proceeds to step S9 and carries out the following steps. When the control unit 23 determines that the current value of the consumption current of the emergency report executing unit 7 is not equal to or higher than the threshold value (lower than the threshold value) (step S21: NO), the control unit 23 proceeds to step S11 and carries out the following steps.

As described above, according to the second embodiment, the voltage step-up circuit 5 increases the voltage during the period in which the current value of the consumption current of the emergency report executing unit 7 is equal to or higher than the threshold value, and the voltage step-up circuit 5 does not increase the voltage during the period in which the current value of the consumption current of the emergency report executing unit 7 is lower than the threshold value. Consequently, according to the current value of the consumption current of the emergency report executing unit 7, the control unit 23 can properly switch the power supply between the mode of increasing the auxiliary power source voltage using the voltage step-up circuit 5 and the mode of not increasing the auxiliary power source voltage. Thus, the auxiliary power source 4 can be used more effectively and more properly. The current threshold, which is used as a criterion of determining whether to activate the voltage step-up circuit 5, is determined in accordance with the temperature of the in-vehicle environment and the age of use of the auxiliary power source 4. Thus, whether to activate the voltage step-up circuit 5 or not is properly determined according to the temperature of the in-vehicle environment and the age of use. Thus, the auxiliary power source 4 can be used more effectively and more properly.

(Other Embodiments)

The present disclosure is not limited only to the foregoing embodiments but can also be modified or expanded as follows.

With respect to the relation between the voltage value of the preliminarily set voltage of the voltage step-up circuit 5 and the voltage value of the preliminarily set voltage of the voltage step-down circuit 3, under a condition that the former voltage is lower than the latter voltage and is within the range of the operation voltages of the functional blocks, the voltage values may be set to any values, and not limited to 4.8V and 5V described in above examples.

Although the present disclosure is applied to the configuration of performing an emergency report in the case where a sensor signal is output from the collision sensor 9 in response to a collision of a vehicle, for example, the present disclosure can also be applied to theft pursuit. When a vehicle is stolen, there is the possibility that the main power source 11 may be intentionally detached from the device with harmful purpose. According to one embodiment, even if the main power source 11 is detached, by extending the life of the auxiliary power source 4, the period in which a theft pursuit signal for notifying the present position of the vehicle can be transmitted can be increased. In the case of applying the present disclosure to theft pursuit, the voltage step-down circuit 3 and the voltage step-up circuit 5 are maintained in the enabled state even when both IG and ACC are in off state.

The above-described disclosure includes the following aspects.

According to an aspect of the present disclosure, a vehicular emergency reporting device 1 includes a voltage step-down unit 3 decreasing a main power source voltage supplied from a main power source 11 to generate a decreased voltage, an auxiliary power source 4 providing a backup power source of the main power source 11, a voltage step-up unit 5 increasing an auxiliary power source voltage supplied from the auxiliary power source 4 to generate an increased voltage, a control unit 6 operating using the increased voltage as an operation voltage when the decreased voltage is lower than the increased voltage, an emergency report executing unit 7 receiving an emergency report execution instruction from the control unit 6 and performing an emergency report. When the decreased voltage is lower than the increased voltage, the emergency report executing unit 7 performs the emergency report using the increased voltage as the operation voltage. The vehicular emergency reporting device further includes a switching unit 6. The switching unit 6 switches a mode of supplying the operation voltage to the control unit 6 and the emergency report executing unit 7 between a first mode and a second mode when the decreased voltage is lower than the increased voltage. The switching unit controls the voltage step-up unit to supply the increased voltage to the control unit 6 and the emergency report executing unit 7 as the operation voltage in the first mode, and controls the auxiliary power source 4 to supply the auxiliary power source voltage to the control unit 6 and the emergency report executing unit 7 as the operation voltage without increasing the auxiliary power source voltage using the voltage step-up unit 5.

In the above vehicular emergency reporting device 1, at the time of performing an emergency report, the switching unit 6 switches the mode of supplying the operation power source between the first mode and the second mode. In the first mode, the auxiliary power source voltage is increased by the voltage step-up unit. In the second mode, the auxiliary power source voltage is not increased by the voltage step-up unit. That is, the switching unit 6 switches the mode of supplying the operation power source between a period of increasing the voltage and a period of not increasing the voltage.

Thus, the switching unit 6 suppresses a continuous increasing of the auxiliary power source voltage supplied from the auxiliary power source. That is, when drop of the voltage value of the auxiliary power source voltage is relatively large and the auxiliary power source voltage needs to be increased, the operation voltage is supplied in the first mode by increasing the voltage using the voltage step-up unit. When the drop of the voltage value of the auxiliary power source voltage is relatively small and increase of the auxiliary power source voltage is not necessary, by supplying the operation voltage in the second mode, a loss caused by continuous operation of the voltage step-up unit can be suppressed. As a result, the auxiliary power source 4 can be used more properly and more effectively. There is a possibility that that the auxiliary power source may deplete during the execution of the emergency report. As described above, since the auxiliary power source 4 can be used more properly and more effectively, a depletion of the auxiliary power source during the emergency report execution can be reduced, and the emergency report can be properly performed. Consequently, the auxiliary power source functioning as the backup power source of the main power source can be used more properly and more effectively, and the emergency report can be properly performed.

Further, when the main power source 11 operates in a normal state, the voltage step-down unit 3 may decrease the main power source voltage supplied by the main power source 11 to generate the decreased voltage.

The decreased voltage has a first set voltage value as a lower limit. When the main power source 11 operates in a normal state, the voltage step-up unit 5 may increase the auxiliary power source voltage supplied by the auxiliary power source 4 to generate the increased voltage. The increased voltage has a second set voltage value as an upper limit and the second set voltage value is lower than the first set voltage value. When the main power source 11 operates in an abnormal state, the voltage step-up unit 3 may output an increased voltage having a voltage value lower than the second set voltage value.

Further, the switching unit 6 may determine an operation state of the emergency report executing unit 7. The operation state is one of a data communication state, a voice call state, or a standby state for a transmission or a reception. When the switching unit 6 determines that the emergency report executing unit 7 is in the data communication state or in the voice call state, the switching unit 6 may set the mode of supplying the operation voltage to the first mode during a period of the data communication state or a period of the voice call state. When the switching unit 6 determines that the emergency report executing unit 7 is in the standby state, the switching unit 6 may set the mode of supplying the operation voltage to the second mode during a period of the standby state.

Further, the switching unit 6 may determine whether a current value of a consumption current of the emergency report executing unit 7 is equal to or higher than a threshold value. When the switching unit 6 determines that the current value of consumption current of the emergency report executing unit 7 is equal to or higher than the threshold value, the switching unit 6 may set the mode of supplying the operation voltage to the first mode during a period in which the current value of consumption current of the emergency report executing unit 7 maintains equal to or higher than the threshold. When the switching unit 6 determines that the current value of the consumption current of the emergency report executing unit 7 is lower than the threshold value, the switching unit 6 may set the mode of supplying the operation voltage to the second mode during a period in which the current value of the consumption current of the emergency report executing unit 7 maintains lower than the threshold.

Further, the switching unit 6 may store predictive threshold values of the consumption current of the emergency report executing unit 7 corresponding to respective temperatures or respective ages of use. The switching unit 6 may specify one of the predictive thresholds corresponding to an ambient temperature of a vehicle or corresponding to an age of use of the vehicle as the threshold value, and determines whether the current value of the consumption current of the emergency report executing unit 7 is equal to or higher than the specified threshold value.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicular emergency reporting device comprising:
   a voltage step-down unit decreasing a main power source voltage supplied from a main power source to generate a decreased voltage;
   an auxiliary power source providing a backup power source of the main power source;
   a voltage step-up unit increasing an auxiliary power source voltage supplied from the auxiliary power source to generate an increased voltage;
   a control unit operating using the increased voltage as an operation voltage when the decreased voltage is lower than the increased voltage;
   an emergency report executing unit receiving an emergency report execution instruction from the control unit and performing an emergency report, when the decreased voltage is lower than the increased voltage, the emergency report executing unit performing the emergency report using the increased voltage as the operation voltage; and a switching unit switching a mode of supplying the operation voltage to the control unit and the emergency report executing unit between a first mode and a second mode when the decreased voltage is lower than the increased voltage, the switching unit controlling the voltage step-up unit to supply the increased voltage to the control unit and the emergency report executing unit as the operation voltage in the first mode and controlling the auxiliary power source to supply the auxiliary power source voltage to the control unit and the emergency report executing unit as the operation voltage without increasing the auxiliary power source voltage using the voltage step-up unit.

2. The vehicular emergency reporting device according to claim 1, wherein, when the main power source operates in a normal state, the voltage step-down unit decreases the main power source voltage supplied by the main power source to generate the decreased voltage, the decreased voltage has a first set voltage value as a lower limit, when the main power source operates in a normal state, the voltage step-up unit increases the auxiliary power source voltage supplied by the auxiliary power source to generate the increased voltage, the increased voltage has a second set voltage value as an upper limit and the second set voltage value is lower than the first set voltage value, and when the main power source operates in an abnormal state, the voltage step-up unit outputs an increased voltage having a voltage value lower than the second set voltage value.

3. The vehicular emergency reporting device according to claim 1, wherein the switching unit further determines an operation state of the emergency report executing unit, and the operation state is one of a data communication state, a voice call state, or a standby state for a transmission or a reception, when the switching unit determines that the emergency report executing unit is in the data communication state or in the voice call state, the switching unit sets the mode of supplying the operation voltage to the first mode during a period of the data communication state or a period of the voice call state, and when the switching unit determines that the emergency report executing unit is in the standby state, the switching unit sets the mode of supplying the operation voltage to the second mode during a period of the standby state.

4. The vehicular emergency reporting device according to claim 1, wherein the switching unit determines whether a current value of a consumption current of the emergency report executing unit is equal to or higher than a threshold value, when the switching unit determines that the current value of consumption current of the emergency report executing unit is equal to or higher than the threshold value, the switching unit sets the mode of supplying the operation voltage to the first mode during a period in which the current value of consumption current of the emergency report executing unit maintains equal to or higher than the threshold, and when the switching unit determines that the current value of the consumption current of the emergency report executing unit is lower than the threshold value, the switching unit sets the mode of supplying the operation voltage to the second mode during a period in which the current value of the consumption current of the emergency report executing unit maintains lower than the threshold.

5. The vehicular emergency reporting device according to claim 4, wherein the switching unit stores predictive threshold values of the consumption current of the emergency report executing unit corresponding to respective temperatures or respective ages of use, and the switching unit specifies one of the predictive thresholds corresponding to an ambient temperature of a vehicle or corresponding to an age of use of the vehicle as the threshold value, and determines whether the current value of the consumption current of the emergency report executing unit is equal to or higher than the specified threshold value.

* * * * *